United States Patent [19]

Hammersmith

[11] 3,957,130

[45] May 18, 1976

[54] STEERING CONTROL FOR TRACTOR GRADER ATTACHMENTS

[76] Inventor: Albert A. Hammersmith, c/o Al Hammersmith & Son Mfg. Co., 4th and Central Ave., Horton, Kans. 66439

[22] Filed: July 15, 1974

[21] Appl. No.: 488,550

Related U.S. Application Data

[63] Continuation-in-part of Ser. No. 276,706, July 31, 1972, Pat. No. 3,881,563.

[52] U.S. Cl. .............................................. 180/159
[51] Int. Cl.² ............................................ B62D 5/00
[58] Field of Search............ 180/11, 12, 14 R, 14 A, 180/79.2 R, 79.2 C

[56] References Cited
UNITED STATES PATENTS

| | | | |
|---|---|---|---|
| 3,119,630 | 1/1964 | Oliver | 180/14 R X |
| 3,191,963 | 6/1965 | Prichard | 180/79.2 R X |
| 3,326,312 | 6/1967 | Buller | 180/14 R |
| 3,478,833 | 11/1969 | Breon et al. | 180/12 |
| 3,651,882 | 3/1972 | Loesch | 180/14 R |
| 3,822,756 | 7/1974 | Martin | 180/14 R |

*Primary Examiner*—Kenneth H. Betts
*Attorney, Agent, or Firm*—Schmidt, Johnson, Hovey & Williams

[57] ABSTRACT

A steering control hookup for use in connection with a mobile assembly comprised of a conventional tractor in which the normal, steerable front wheel and axle structure is in a raised, non-ground engaging disposition, and a grader blade attachment provided with a ground-engaging front wheel and axle unit having a steering apparatus. The steering hookup includes an arrangement of selectively shiftable hydraulic valves interposed in a power steering system of the tractor in order to render the steering apparatus of the attachment responsive to actuation of the power steering system while at the same time rendering a steering mechanism associated with the tractor front wheel end axle structure inoperative, thus making the turning movements of the mobile assembly responsive solely to the operation of the steering apparatus of the attachment.

2 Claims, 2 Drawing Figures

U.S. Patent  May 18, 1976  3,957,130
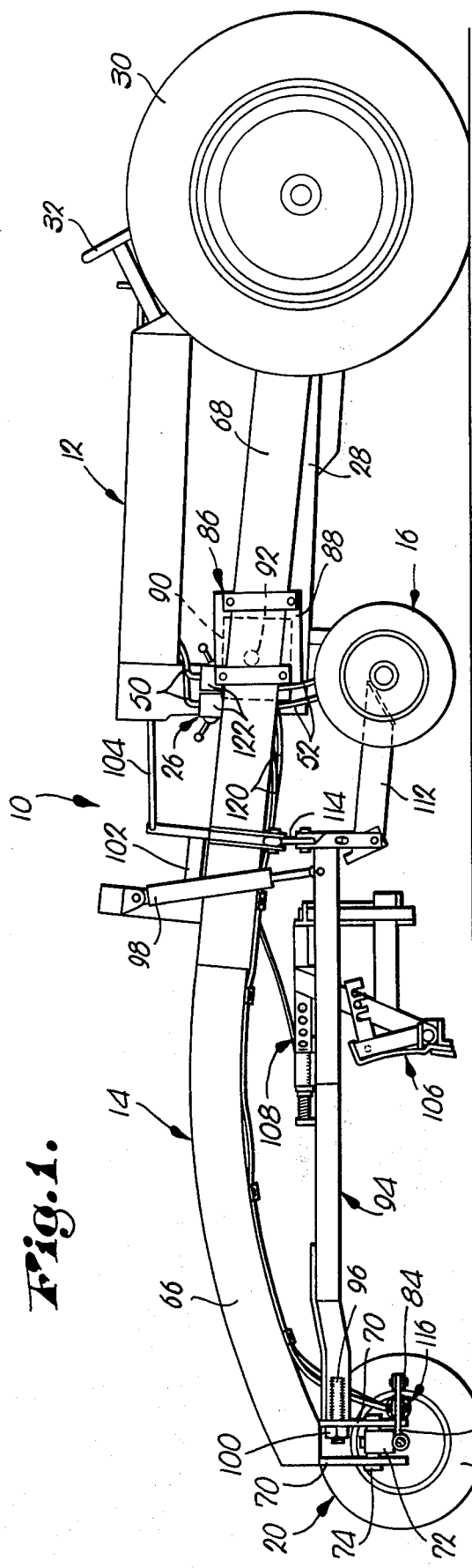
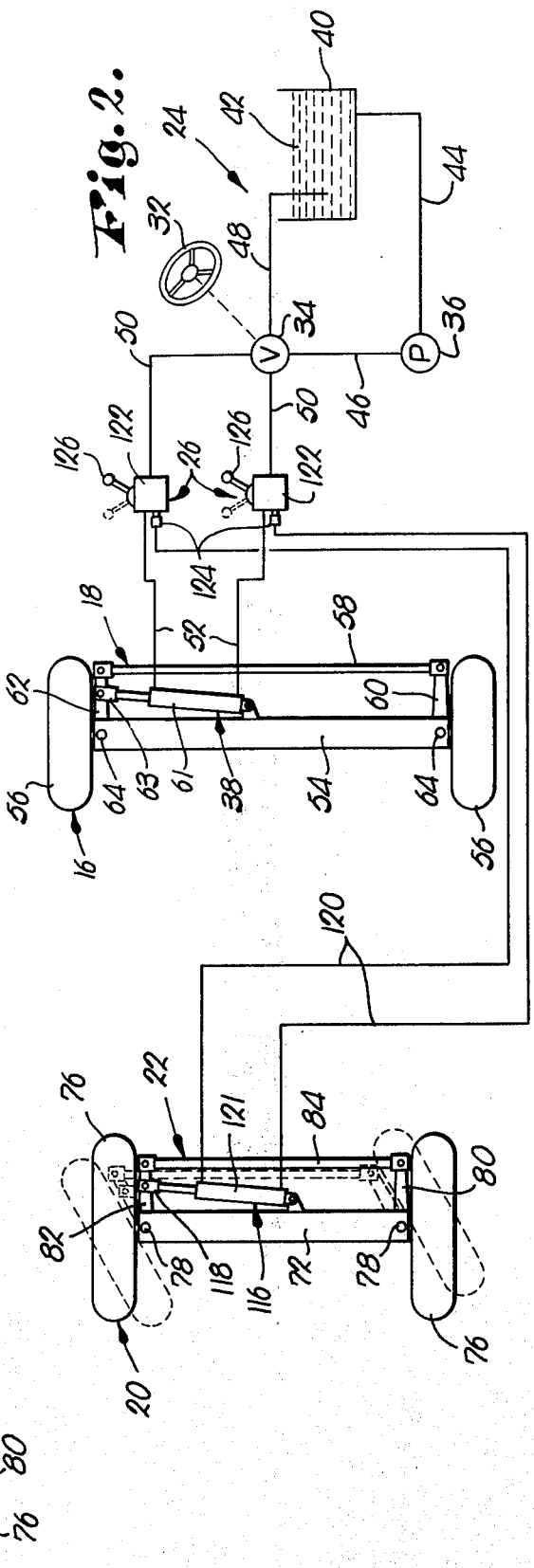

STEERING CONTROL FOR TRACTOR GRADER ATTACHMENTS

CROSS REFERENCE

This is a continuation-in-part of my copending application Ser. No. 276,706, filed July 31, 1972, now U.S. Pat. No. 3,881,563 issued May 6, 1975 and entitled "Grader Blade Attachment For Tractors".

This invention relates to a steering control hookup for a steerable mobile assembly comprised of a powered vehicle, such as a tractor, and a tool-supporting frame attachment secured thereto in such a manner that the usual steerable front wheel and axle structure of the vehicle is in a raised, non-ground engaging disposition and in which turning movement of the assembly is responsive solely to operation of a steering apparatus of a ground-engaging, front wheel and axle unit of the attachment. My copending application discloses a manner in which the vehicle front wheel and axle structure and the attachment wheel and axle unit are mechanically interconnected to transfer the turning movements from the front wheel and structure to the attachment's front wheel and axle unit.

It is a very important object of this invention to provide in a mobile assembly, as shown in my prior, co-pending application, a steering control hookup in which the wheel and axle structure of the tractor is bypassed and the wheel and axle unit of the attachment is hydraulically linked to a power steering system of the tractor.

A still further very important object of my invention is to provide a steering hookup which avoids the necessity to incorporate any type of mechanical linkage between the front wheel steering device of the tractor and that of the frame attachment.

It is another important object of this invention to provide a steering hookup for a tractor grader attachment that is capable of utilizing a power steering system of a tractor to control a second or alternate steering device in lieu of the conventional tractor steering device when the front wheel and axle structure of the tractor is in a raised, non-ground engaging disposition.

A further object of my invention is to provide a steering hookup for a steerable attachment to a vehicle in which the actual point of connection between the power steering system and the steering device of the attachment may be permanently mounted on the powered vehicle and in which the power steering system need not be disassembled during connection to or removal of the attachment to or from the tractor, thereby avoiding the risk of contaminating the hydraulic steering system.

In the drawing:

FIG. 1 is a side elevational view of a tractor with a grader blade attachment secured thereto and having a steering hookup incorporated therewith made pursuant to the invention, one of the front wheels of the attachment being removed to reveal details of construction; and FIG. 2 is a schematic view illustrating the hookup of the steering device of the attachment with a power steering system of the tractor.

A steerable mobile assembly generally designated by the numeral 10 is comprised of a vehicle 12, such as a conventional farm or industrial tractor, to which an elongated, forwardly extending, tool-supporting frame 14 is rigidly and releasably secured. The tractor 12 is provided with a front wheel and axle structure 16 having a steering mechanism 18, and the frame 12 is likewise provided with a front wheel and axle unit 20 having a steering apparatus 22. The tractor 12 further includes a power steering system, broadly designated by the numeral 24, with the steering apparatus 22 being operably coupled therewith by coupling means generally identified by the numeral 26.

The tractor 12 includes an elongated, fore and aft chassis 28 to which the front wheel and axle structure 16 is attached and to which a pair of rear drive wheels 30 (only one shown) are operably attached. An operator-actuated steering wheel 32 is operably coupled to the power steering system 24 which includes a hydraulic steering valve 34 responsive to actuation of the steering wheel 32, a hydraulic pump 36, and a fluid actuated piston and cylinder assembly 38. As is schematically shown in FIG. 2, the power steering system 24 further includes a reservoir 40 for a supply of hydraulic fluid 42, there being the usual conduits 44 and 46 interconnecting the pump 36 with the reservoir 40 and the valve 34, respectively, it being understood that a fluid-return conduit 48 also interconnects the valve 34 with the reservoir 40. As is well-known by those experienced in the field, the pump 36 draws hydraulic fluid from the reservoir 40 for delivery to the valve 34, and ultimately, the piston and cylinder assembly 38.

Normally, the conventional, double-acting piston and cylinder assembly 38 is placed in full communication with the valve 34 by way of a pair of uninterrupted hydraulic lines interconnecting opposite ends of a cylinder portion 61 of the assembly 38 with the valve 34 for alternately feeding pressure to both ends of the cylinder portion 61. However, in this instance, the lines are each separated to receive their respective coupling means 26, resulting in there being a pair of lines 50 interconnecting the valve 34 with respective coupling means 26, and a second pair of lines 52 interconnecting the coupling means 26 with the piston and cylinder assembly 38.

The wheel and axle structure 16 is of the usual construction and includes a transverse axle 54 having steerable ground-engaging wheels 56 which are controlled by the steering mechanism 18 through the use of a tie rod 58 interconnecting a pair of cranks 60 and 62 that are rigidly attached to a corresponding kingpin 64 at each end of the axle 56. The cylinder portion 61 of the piston and cylinder assembly 38 is pivotally secured to the axle 54, while a rod end 63 of the assembly 38 is pivotally attached to the crank 62 such that the latter swings in an arc about its kingpin 64 in response to the lengthening or shortening of the assembly 38 to accomplish, along with the corresponding swinging of the crank 60, the turning movement of the wheels 56.

The frame 14 includes an elongated body 66 that is arched upwardly longitudinally therealong and is provided with a pair of spaced, rearwardly extending arms 68 (only one of which is shown) between which the chassis 28 of the tractor 12 is disposed. A pair of spaced plates 70 depend from the body 66 at its forward end and receive a transverse bar 72 therebetween that is swingable vertically about a fore-and-aft pin 74 which interconnects the plates 70. The bar 72 forms a part of the front wheel and axle unit 20 and supports a pair of wheels 76. The conventional steering apparatus 22 for the wheels 76 includes once again, the usual kingpins 78 with corresponding cranks 80 and 82 rigid to respective ones of the kingpins 78 and which are pivotally interconnected by a tie rod 84.

Each arm 68 has a mounting assembly 86 that includes a plate 88 adjustably clamped thereon, and a corresponding mounting bracket 90 secured to the chassis 28 in any suitable manner. The bracket 90 has an outwardly extending projection 92 adapted to fit within a cooperating socket portion of the plate 88 to effect a mounting for the frame 14 to the vehicle 12. The rear or trailing ends of the arms 68 are also suitably secured to an axle housing (not shown) of the vehicle 12 adjacent the rear drive wheels 30.

A vertically adjustable, transversely rotatable tool mount 94 is shiftable relative to the frame 14 and is suspended therefrom by a forwardly protruding threaded shaft 96 which passes through an oversized opening in the rearwardmost plate 70 and by a pair of generally upright, transversely spaced-apart hydraulic cylinder assemblies 98 located generally midway between the fore and aft ends of the frame 14. The shaft 96 is maintained in engagement with the plate 70 by a threaded nut 100 and the piston and cylinder assemblies 98 are controlled by a hydraulic valve 102 having a pair of rearwardly extending control rods 104.

Various types of tools may be carried by the tool mount 94, as for example, a transversely, elongated scraper blade 106 which may be held in any number of transverse, angular positions by a quadrant assembly 108. A pair of vertically swingable standards 112 are provided to support the frame 14 when it is disengaged from the vehicle 12 and a transverse stabilizer arm 114, interconnecting the frame 14 and the trailing end of the mount 94, limits the lateral movement of the mount 94 relative to the frame 14. Additional details of the construction of the frame 14, along with its tool mount 94, and the manner of attachment of the frame 14 to the vehicle 12, are described in detail in the aforementioned copending application and do not form a part of the instant invention.

Turning now to the wheel and axle unit 20 forming a part of the frame 14, a second double-acting piston and cylinder assembly 116 is pivotally secured to the bar 72 in the conventional manner of a power steering cylinder with a rod end 118 of the assembly 116 being pivotally attached to the crank 82, thereby making the steering apparatus 22 responsive to the changes in the effective length of the assembly 116 which causes the cranks 80 and 82 to swing in an arc about their respective kingpins 78.

Interconnection between the piston and cylinder assembly 116 and the power steering system 24 is effected through the use of a pair of hydraulic fluid lines 120 which extend from opposite ends of a cylinder portion 121 of the assembly 116 and are respectively coupled to a corresponding selector valve 122 included as a part of the coupling means 26. The selector valves 122 are conveniently mounted on the vehicle 12 and are each provided with a manually operated selector lever 126 for directing the flow of hydraulic fluid to either of its corresponding lines 52 or 120, the levers 126 being in the dotted line position as shown in FIG. 2 when the fluid is to be directed through the lines 120 and in a second position as shown by the solid lines in FIG. 2 when the fluid is to be directed through the lines 52. Each line 120 is adapted for quick-connect-disconnect through the use of a quick coupler 124 adjacent each valve 122 and which is of the kind readily available for use in connection with hydraulic lines.

In use, once the mobile assembly 10 has been effected through suitable coupling of the frame 14 with the vehicle 12, the wheel and axle structure of the tractor 12 is in a raised, non-ground engaging disposition and, therefore, the steering mechanism 18 is ineffective for the purpose of controlling the turning movements of the assembly 10. It is for this reason that the wheel and axle unit 20 of the frame 14 is provided with the steering apparatus 22.

Incorporation of the selectively shiftable, flow-directing valves 122, which may be permanently installed on the vehicle 12, makes it possible to take full advantage of the power steering system of the tractor to control the turning movements of the assembly 10 even though the tractor steering mechanism is ineffective because of its non-ground engaging disposition. The deactivation of the steering mechanism 18 precludes any turning movement of the wheel and axle structure 16 yet full steering control to the wheel and axle unit 20 through use of the conventional power steering system is maintained as depicted by the broken lines in FIG. 2. No time consuming and undesirable disassembly or reassembly of the power steering system is necessary each time the frame 14 is secured to the tractor 12 or removed therefrom; thus the power steering system remains essentially closed at all times and the chance of contaminating the fluid with dirt, moisture, etc. is for all practical purposes, avoided. Further, the present invention as herein shown, discloses a way in which the full efficiency of the power steering system may be utilized to incorporate the same with a second steering apparatus.

By blocking out the piston and cylinder assembly 38 of the tractor steering mechanism 18 the disadvantages of a time lag in actuation of the piston and cylinder assembly 116 on the frame 14 relative to the piston and cylinder assembly 38 on the tractor 12 and the need for supplying a much greater quantity of hydraulic fluid to supply two piston and cylinder assemblies are eliminated. It is to be noted that were the piston and cylinder assembly 38 maintained in an actuatable condition during operation of the mobile assembly 10, the piston and cylinder assembly 38 on the tractor 12 would tend to respond to actuation of the power steering system before the piston and cylinder assembly 116 on the frame 14 because of the lower resistance to movement by virtue of the wheel and axle structure 16 being in a non-ground-engaging condition. Further, no costly, complex and difficult to maintain and adjust mechanical linkages are required.

At the time the vehicle 12 is to be again used for its conventional purpose with the frame 14 separated and removed from the vehicle 12 with the wheel and axle structure lowered to a ground-engaging disposition, it is but a simple matter to quickly disconnect the lines 120 from their respective valves 122 by means of the quick disconnect couplers 124 and shift the levers 126 to again direct the flow of hydraulic fluid to the piston and cylinder assembly 38 of the tractor steering mechanism 18. This again renders the vehicle 12 fully responsive to the steering action of the mechanism 18 upon actuation of the power steering system 24 without requiring any disassembly, re-plumbing, or other time-consuming modification of the latter and its attendant risk of damage to the system. Likewise, the same advantages are equally significant when, conversely, the frame 14 is to be secured to the tractor 12.

Having thus described the invention, what is claimed as new and desired to be secured by Letters Patent is:

1. In a steerable mobile assembly:
    a powered vehicle equipped with a fluid-actuated, power steering system and a front wheel and axle structure having a steering mechanism provided with a fluid operated actuator operably coupled with said power steering system;
    a tool-supporting frame provided with a ground-engaging front wheel and axle unit having a steering apparatus which includes a fluid-operated actuator;
    means releasably securing said frame to said vehicle with said frame extending forwardly of said vehicle wheel and axle structure and supporting the latter in a raised, non-ground-engaging disposition; and
    releasable coupling means operably interconnecting the actuator of said frame axle unit steering apparatus in flow communication with the power steering system of said vehicle to render the front wheel and axle unit of said frame responsive to actuation of the power steering system whereby turning movement of the mobile assembly is responsive solely to operation of the steering apparatus of said frame front wheel and axle unit,
    said coupling means including selectively positionable flow-directing means,
    said flow-directing means being positionable in a first position in which the actuator of said vehicle steering mechanism is rendered nonoperative and the actuator of said frame steering apparatus is rendered operative in response to actuation of the power steering system,
    said flow-directing means being further positionable in a second position for rendering the actuator of said vehicle steering mechanism operative in response to actuation of the power steering system when said frame is removed from the vehicle and said coupling means are released to remove the actuator of the frame steering apparatus from said communication.

2. An assembly as claimed in claim 1, wherein said flow-directing means is a pair of manually shiftable valves substantially permanently mounted on said vehicle and operably interposed in flow communication with said power steering system.

* * * * *